United States Patent [19]

Rowland et al.

[11] 4,356,139
[45] Oct. 26, 1982

[54] METHOD FOR LUBRICATING CABLE IN A DRY CURING SYSTEM

[75] Inventors: Bobby A. Rowland; Stanley L. Tate, both of Carrollton; Michael C. Smith, Newnan, all of Ga.

[73] Assignee: Southwire Company, Carrollton, Ga.

[21] Appl. No.: 215,910

[22] Filed: Dec. 12, 1980

[51] Int. Cl.³ .......................... B29D 3/00; B29G 2/00
[52] U.S. Cl. .................................. 264/174; 264/213; 264/255; 264/300; 264/347
[58] Field of Search .............. 366/165, 339, 167, 173; 427/222, 213; 118/303, 612; 264/174, 236, 300, 347, 349, 213, 255

[56] References Cited

U.S. PATENT DOCUMENTS

| | | | |
|---|---|---|---|
| 2,245,040 | 6/1941 | Marks | 427/222 |
| 2,353,000 | 7/1944 | Austin | 264/300 |
| 2,561,394 | 7/1951 | Marshall | 427/213 |
| 2,990,604 | 7/1961 | MacCormack | 264/130 |
| 3,054,142 | 9/1962 | Hinderer et al. | 264/174 |
| 3,183,288 | 5/1965 | Taylor et al. | 264/130 |
| 3,492,394 | 1/1970 | Heine | 264/213 |
| 3,692,896 | 9/1972 | Tsumura et al. | 264/300 |
| 3,803,284 | 4/1974 | Burghardt et al. | 264/130 |
| 3,827,888 | 8/1974 | Terwilliger et al. | 366/339 |
| 3,859,247 | 1/1975 | Mackenzie | 264/236 |
| 3,928,525 | 12/1975 | Fuwa et al. | 264/174 |
| 3,971,883 | 7/1976 | Meeks et al. | 264/174 |
| 4,040,997 | 8/1977 | Van Vonno et al. | 422/222 |
| 4,179,321 | 12/1979 | Verghese | 264/130 |
| 4,247,504 | 1/1981 | Karpo | 264/174 |
| 4,259,024 | 3/1981 | Clasen et al. | 366/339 |
| 4,271,211 | 6/1981 | Knepper | 427/222 |
| 4,272,466 | 6/1981 | Harris | 266/40.6 |

FOREIGN PATENT DOCUMENTS

| | | | |
|---|---|---|---|
| 2738764 | 3/1979 | Fed. Rep. of Germany | 264/174 |
| 1237144 | 6/1971 | United Kingdom | 427/213 |

Primary Examiner—Willard E. Hoag
Attorney, Agent, or Firm—Herbert M. Hanegan; Stanley L. Tate; Michael C. Smith

[57] ABSTRACT

Disclosed is a method for continuously lubricating cable during continuous dry curing of cable insulation and insulation shield to reduce friction between the cable surface and the dry curing apparatus, thereby eliminating cable oscillation and vibration and increasing product quality and the speed of production, comprising coating insulation compound pellets and insulation shield compound pellets with incompatible lubricant immediately prior to extrusion of insulation and insulation shield on to the cable.

17 Claims, 9 Drawing Figures

METHOD FOR LUBRICATING CABLE IN A DRY CURING SYSTEM

BACKGROUND OF THE INVENTION

In the cable making art there are generally two types of insulation and/or jacket material used in the fabrication of electrical wire and cable, thermosetting materials and thermoplastic materials. The application of thermoset materials as the insulation or jacket of an electrical wire or cable requires the use of vulcanization (curing) apparatus to cause the thermosetting reaction to occur. Until recently the most widely accepted technique of manufacturing extruded vulcanized type cables was to pass the conductor though a series of extruder heads and apply concentrically the semiconducting, and insulating compounds. After application of the semiconducting and insulating compounds, the cables are vulcanized (cured) under pressure in a saturated stream environment followed by cooling under pressure. In such a steam curing process, the insulated conductor is moved through the vulcanizer and exposed to pressurized (typically 250 psi) saturated steam followed by cooling under pressurized water (typically 250 psi). The thermosetting compound contains curing agents which are activated at the high temperatures found within the vulcanizer with the speed of the vulcanization reaction depending on the temperature within the vulcanizer (for 250 psi steam, approximately 210° C.).

The steam curing process has been used in horizontal, vertical, slant and catenary installations. Long length curing pipes have been demonstrated to be preferred by those practicing the art of steam curing cables, this is so because polyethylene and ethylenepropylene rubber insulations characteristically have high thermal resistances and therefore, heavily insulated cables of the type used for high voltage operation take a long time to cure. In addition to the problems of low cure rates and corresponding low production rates achieved using steam cure processes, is the problem created by the required exposure of the cable insulation to high pressure steam which has been shown to penetrate the insulation and to create microscopic cavities or voids within the insulation. Such voids limit or even reduce the dielectric strength of the cured insulation. In order to eliminate these and other problems associated with steam curing cable insulation, a number of different systems have been proposed, among these systems are those disclosed and claimed in U.S. Pat. Nos.: 3,635,621; 3,868,463; 3,901,633; 4,043,722; 4,069,286 and 4,080,131. The most significant system uses high temperature and pressure inert gases to cure the insulation and a dry cooling process to cool the cured insulation. While the transition to dry-cure vulcanization systems has improved the electrical properties of the vulcanizate, it has been found that additional problems have been created by abandoning the use of steam as the vulcanization heat source. Chief among the new problems encountered when a dry-cure/dry-cool vulcanization system is used in all but a full catenary arrangement is an oscillation or vibration of the cable which occurs as the extruder-vulcanizer production rate is increased past a critical point for the particular equipment being used. This oscillation causes a ripple effect in the insulation being applied because the cable is mechanically unstable as it passes through the extrusion die and therefore incapable of following a constant path as it moves through the extruder die. This oscillation also causes the insulation to be abraded by contact with the inner wall of the vulcanization tube. It has been found that this phenomenon is aggravated when a tandem extrusion process is used to apply both the insulation and insulation shield so that only one pass through the vulcanizer is required to cure both the insulation and insulation shield and conversely, its effects are mitigated if separate passes through the extrusion apparatus are used for the application of and vulcanization of the cable insulation on the first pass and the insulation shield on the second pass. In accordance with the present invention is has been determined that the cause of the oscillation/vibration problem was related to the extrusion sequence in that when tandem extrusion is not used certain organic by-products of the curing reaction are discharged by the cable insulation and condensed on the interior walls of the vulcanization apparatus.

When a tandem extrusion process is used to extrude the insulation shield over the insulation prior to vulcanization these same cure reaction by-products are trapped inside the insulation by the insulation shield. When the by-products were analyzed they were found to contain about 57% acetophenone, 21% cumyl alcohol, 10.5% methylstyrene, 1.8% cumene and 9.7% unknown. It was finally determined that the condensed decomposition products served as a lubricant to reduce the co-efficient of friction between the interior walls of the vulcanization tube and the cable insulation thereby reducing frictional drag and preventing oscillation of the cable much as would the saturated steam of a steam cure system. It was found in a dry cure vulcanization system without lubrication, the moving cable tends to momentarily stick at points of contact with the vulcanization apparatus and then after tension on the cable increases to a point at which the static component of the friction force is overcome the cable slides forward until the decreasing tension is less than the Kenetic component of the frictional force at which time the cable momentarily sticks again. This processes is continuously repeated until the insulation is no longer in contact with the interior walls of the curing tube. This is sometimes called a slip-stick phenomenon and is readily seen on a semi catenary, slant or horizontal vulcanization line where the dry cable insulation touches the bottom of the hot, dry tube inner surface. Interaction of the dry surfaces of these two create oscillations of the cable catenary resulting in vibration which severly limits cable quality and process production rate.

SUMMARY OF THE INVENTION

The present invention solves the friction and vibration problems associated with dry curing systems by introducing a process for continuously reducing the coefficient of friction between the cable insulation or insulation shield and the interior wall of a continuous vulcanization tube of the type used to cure cable and heavy wall cable insulation by the dry cure-dry cool process. This process comprises a method and apparatus for applying incompatible lubricant to insulation compound pellets and insulation shield compound pellets immediately prior to extrusion of insulation and insulation shield on to the cable. Related pellet preparation processes are disclosed in U.S. Pat. Nos. 3,956,214 and 4,035,322.

Thus it is a major object of the present invention to provide a method and apparatus for continuously lubricating cable during continuous vulcanization of cable insulation thereby reducing friction between the cable insulation and the dry curing apparatus.

Another object of this invention is to eliminate cable oscillation and vibration between the extruder which insulates the cable and the reel upon which the finished product is wound as it exits the vulcanization apparatus.

Still another object of this invention is to increase cable quality and productivity.

Yet another object of the present of invention is to increase the productivity of methods of and apparatus for producing thermoset insulated wire and cable.

BRIEF DESCRIPTION OF THE DRAWINGS

While the specification concludes with claims particularly pointing out and distinctly claiming the subject matter which is regarded as the invention, it is believed that the invention, objects, features and advantages thereof will be better understood from the following description taken in connection with the accompanying drawings wherein:

DESCRIPTION OF THE PREFERRED EMBODIMENT

Figure 1A:
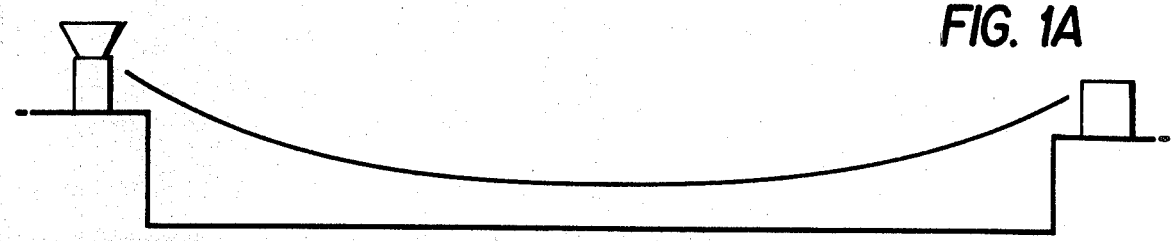
FIG. 1a is a schematic-elevational view of a continuous vulcanization system.
Figure 1B:
FIG. 1b is a schematic-elevational view of a continuous vulcanization system.
Figure 1C:
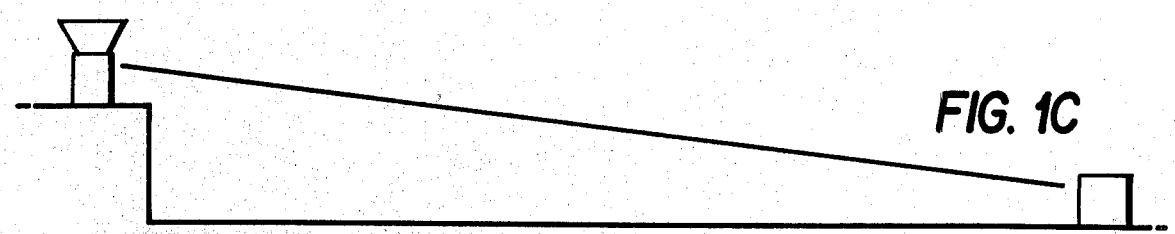
FIG. 1c is a schematic-elevational view of a continuous vulcanization system.
Figure 1D:
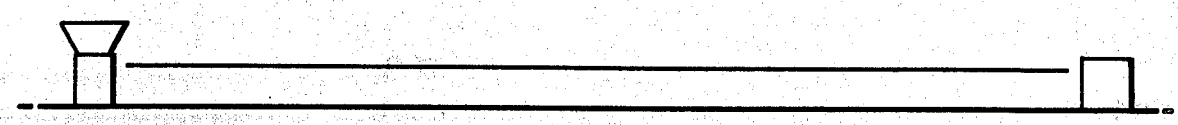
FIG. 1d is a schematic-elevational view of a continuous vulcanization system.

FIGS. 1a, 1b, 1c, and 1d illustrate schematically the general vulcanization tube configurations available for use with either a saturated steam vulcanization medium or with dry cure systems using a hot inert gas vulcanization medium. FIG. 1a illustrates a full catenary line, FIG. 1b illustrates a half catenary line, FIG. 1c, illustrates a slant configuration and FIG. 1d illustrates a line having a horizontal configuration. It can readily be seen from an examination of FIG. 1 that with the exception of the full catenary system, the cable having insulation applied and cured will always touch the interior walls of the vulcanization tube at some point along its path through the vulcanization tube because the normal curve followed by a conductor stretched between two points is a catenary curve. At this point 12, as seen in more detail in FIG. 2, the moving cable 10 will momentarily stick to the interior wall of the vulcanization tube 11. As the forward motion of cable 10 stops for this instant, tension on the cable will increase to an amount which is greater than the static component of the frictional force retarding the movement of cable 10 through vulcanization tube 11. When this amount of tensional force is applied to cable 10, the cable will resume its forward progress through vulcanization tube 11 until the tensional force is less than the kinetic component of the frictional force created by the touching of the cable and the interior wall of vulcanization tube 11 at which point the forward progress of cable 10 through tube 11 will again stop and the progress will be repeated until increment by increment of cable 10 passes point 12. The frictional force which retards the progress of cable 10 through tube 11 is proportional to the coefficient of friction of the materials in contact (the inner wall of vulcanization tube 11 and the insulation or insulation shield of cable 10). This stick-slip-stick phenomenon causes cable 10 to oscillate or vibrate along its entire length thereby causing the path of cable 10 through extruder head 20 of FIG. 2 to vary and results in an irregular extrudate surface.

Figure 2:
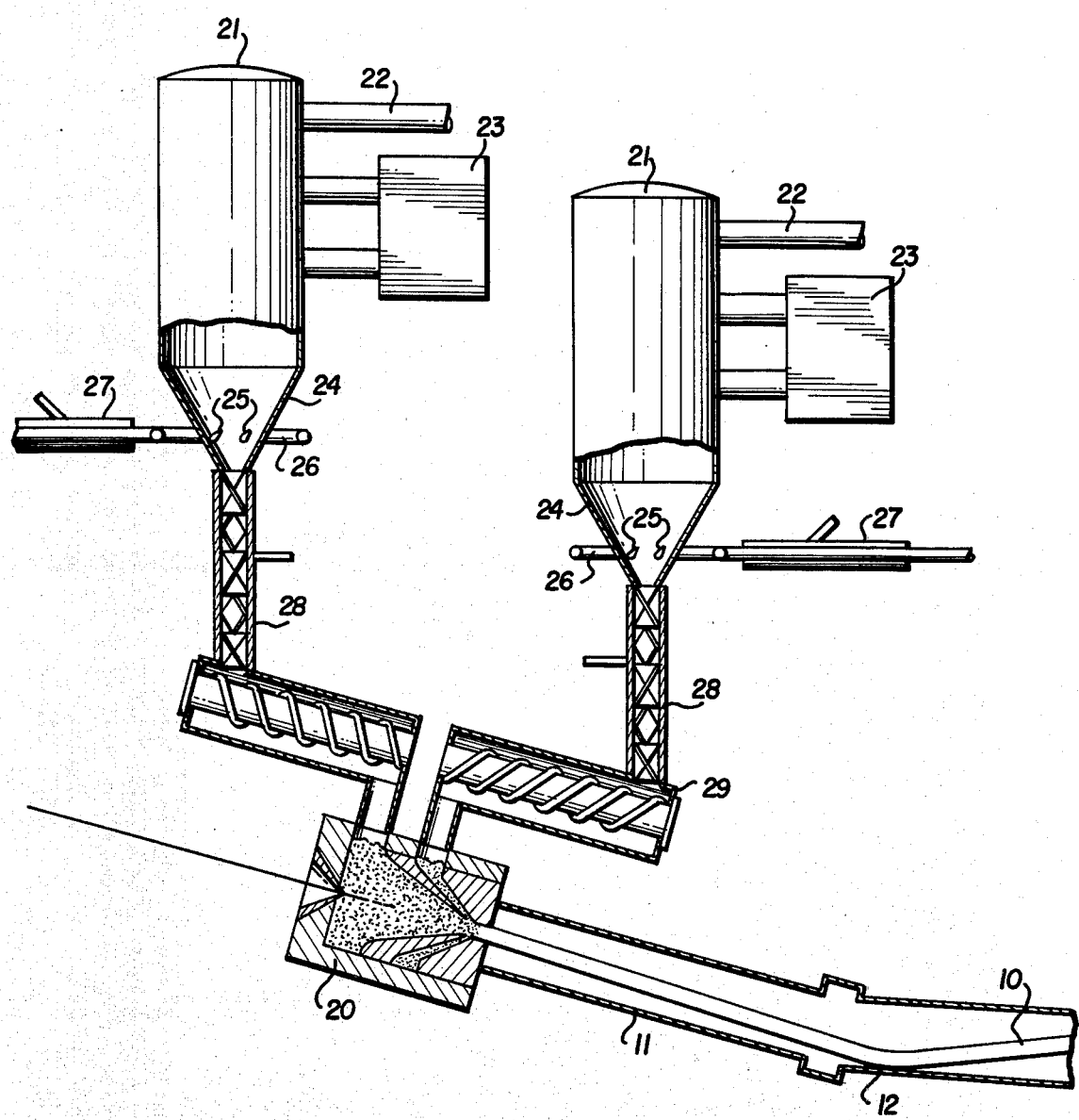
FIG. 2 is a cross sectional view of the preferred apparatus of the present invention.

To solve these problems, incompatible lubricant is adsorbed onto the particles of insulation compound, insulation shield compound or both immediately prior to extrusion. Referring to FIG. 2, particles are transported from remote storage means (not shown) to compound hoppers 21 of the present invention by means of conveyors 22. While in the hoppers 21 the particles or pellets are dehumidified and heated to about 140° F. by hopper dryers 23. The dry pellets descend to the funnels 24 of the hoppers 21 where a plurality of symmetrically spaced lubricant nozzles 25 spray small quantities of atomized incompatible lubricant at high velocity angularly upward in spiral or circular patterns thus beginning to mix the lubricant with the pellets. The manifolds 26 carrying the lubricant to the nozzels 25 are jacketed with heating means 27 to heat the incompatible lubricant to about 140° F. for proper flow and atomization of the lubricant, and to promote adsorption of the lubricant onto the hot pellets. The pellets then descend through motionless mixers 28 which further mix the pellets and lubricant until the lubricant is uniformly dispersed throughout the pellets. From the motionless mixers 28 the pellet/lubricant mixtures enter the extruders 29 which melt, shear, mix and extrude the mixtures onto the cable 10 as it advances through the extruder head 20.

Figure 4:
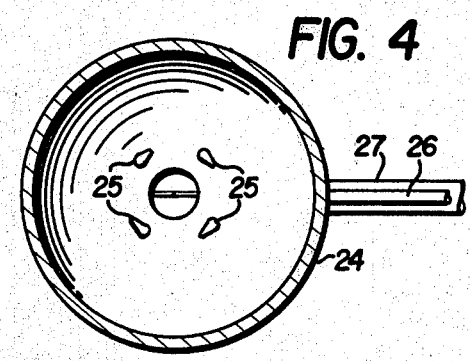
FIG. 4 is a top view of a compound hopper of preferred embodiment.
Figure 3:
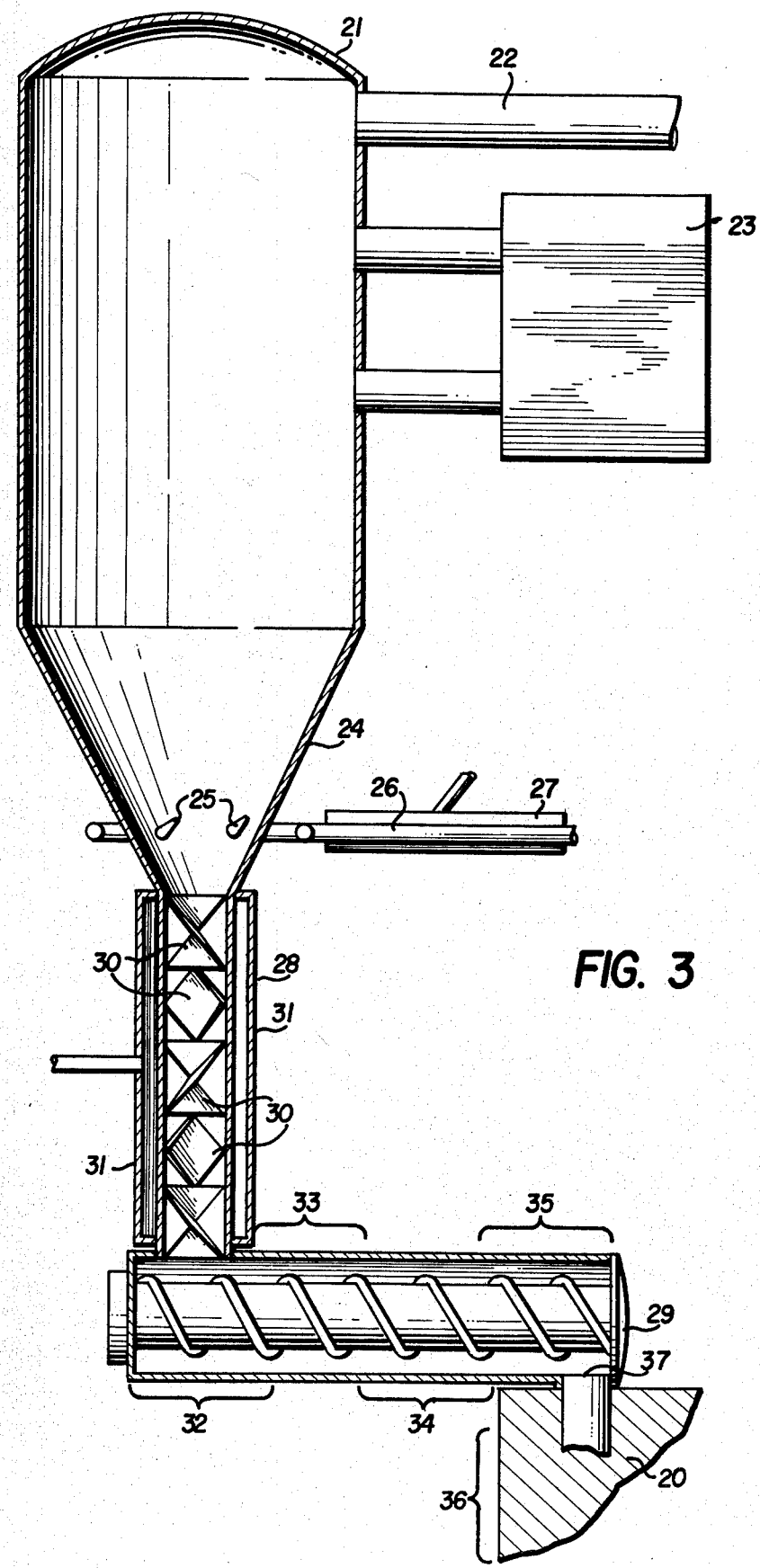
FIG. 3 is a cross sectional view of upper portions of the preferred embodiment.

Referring to FIG. 3, the upper portion of the present invention is shown in more detail. As the pellets descend to the funnel 24 of the hopper 21, the lubricant heated by the heating means 27 passes through the manifold 26 surrounding the funnel 24 to the symmetrically spaced nozzels 25 which extend into the funnel 24 and spray atomized lubricant at high velocity angularly upward creating spiral or circular turbulence of the pellets in a particular direction. FIG. 4 illustrates the symmetrical alignment of the nozzles 25 within the funnel 24. The lubricant begins to mix with the pellets while moving in the particular direction. The lubricant and pellets then gravity feed to the motionless mixer 28 which comprises a multiplicity of fixed, off-set helical elements 30. The uppermost helical element 30 has spiral alignment opposite to the particular direction of the spiral turbulence of the pellets created by the nozzels 25. Thus the pellets and lubricant abruptly change direction as they enter the motionless mixer 28 to intensify mixing of the lubricant with the pellets.

Figure 5:
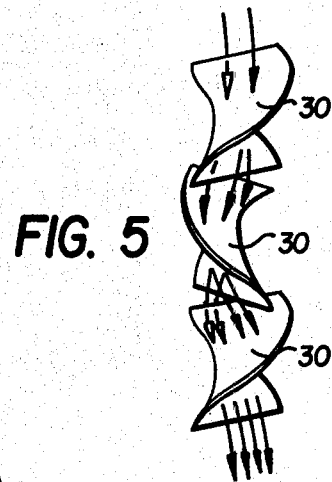
FIG. 5 is an elevation of a portion of a motionless mixer of the preferred embodiment.

Subsequent off-set helical elements 30 thoroughly mix the pellets and the lubricant by subdividing the mixture flow resulting in exponential increase in stratification as shown by FIG. 5. The number of striations produced is $2^n$ where n is the number of elements. The resulting uniform dispersion of adsorbed lubricant prevents bridging and agglomeration of the mixture. The motionless mixer 28 is jacketed with heating means 31 which increases the temperature of the pellets to near melting as the uniform pellets/lubricant mixture reaches the extruder 29.

There are a plurality of heat zones 32, 33, 34, 35 and 36 within the extruder 29 which increases the mixture temperature to proper extrusion temperature. Where high voltage cable insulation with a melting range of 240° F. to 270° F. is processed by this invention the first heat zone 32 has a temperature of 230° F., the second heat zone 33 has a temperature of 240° F., the third heat zone 34 has a temperature of 250° F., the fourth heat zone 35 has a temperature of 260° F., and the extruder head heat zone 36 has a temperature of 260° F. Where low voltage (about 600 volt) cable insulation with a melting range of 250° F. to 290° F. is processed by this invention the first heat zone 32 has a temperature of 230° F., the second heat zone 33 has a temperature of 240° F., the third heat zone 34 has a temperature of 250° F., the fourth heat zone 35 has a temperature of 260° F., and the extruder head heat zone 36 has a temperature of 260° F. Where semiconductive insulation shield with a melting range of 250° F. to 260° F. is processed by this invention the first heat zone 32 has a temperature of 220° F., the second heat zone 33 has a temperature of 230° F., the third heat zone 34 has a temperature of 240° F., the fourth heat zone 35 has a temperature of 260° F., and the extrusion head heat zone 36 has a temperature of 260° F.

Screens 37 for filtering the mixture and assuring proper back pressure will also differ depending upon the mixture processed. For high voltage cable insulation 20–40–80–100 mesh per square inch screens can be used. For low voltage power cable insulation 20–40–60 mesh per square inch screens can be used. For semiconductive insulation shield 20–40–60 mesh per square screens can be used.

Figure 6:
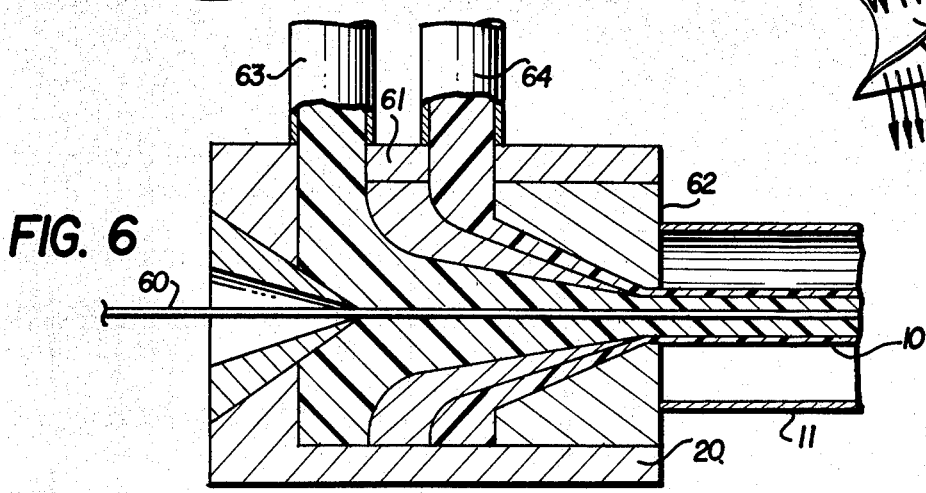
FIG. 6 is a cross sectional view of the extruder head of the preferred embodiment.

From the extruders 29 the molten mixtures pass into the extruder head 20 of FIG. 6 where they are extruded onto the advancing central conductor 60 by a tip 61 and a die 62 to form the cable 10 which then enters the vulcanization tube 11.

Referring again to FIG. 2, as the cable 10 enters the curing tube 11, the incompatible lubricant migrates to the outer surface of the cable 10 to provide lubrication as the cable 10 nears touch down point 12. Uniform dispersion of the small quantity of incompatible lubricant and the high pressure within the vulcanization tube 11 prevents voids within the cable 10 which might otherwise result from lubricant migration. The lubricant reduces the coefficient of friction between the cable 10 and the interior wall of vulcanization tube thereby reducing the frictional forces which would retard the forward progress of cable 10 through vulcanization tube 11. This reduction in frictional forces allows cable 10 to pass freely through vulcanization tube 11 without experiencing the friction induced oscillation or vibration described above thereby permitting optimum production rates to be achieved. Additionally the cable produced using the tandem extrusion technique previously described contains the by products of the chemical crosslinking reaction which have been found to improve the electrical "tree resistance" properties of the cable over that of similar cables produces by a multiple pass extrusion/vulcanization process. Thus, friction induced oscillation and vibration are eliminated and the electrical tree resistance of cable produced by the method of the present invention is improved.

The quantity of lubricant used can be varied from about 0.001 liter to about 1000 liters per hour, preferably 1 liter to 10 liters per hour depending on production speed and type of lubricant used. Several lubricants have been found satisfactory for this process. Among them are: hydrocarbon derivitives, high temperature paraffinic, flax detergents, alkylaryl polysiloxane, polydimethyldiphenylsiloxane, water-dilutable siloxane emulsion, polydimethylsiloxane, water-dilutable silicone emulsion, glycerol, polyalkylene glycol, trihydroxyhexane, polyethylene glycol, polyethylene propylene glycol, aluminum stearates, zinc stearates, stearic acids, animal detergents, vegetable detergents, and mixtures thereof. Where the preferred lubricant is a powder such as aluminum stearates or zinc stearates the lubricant is mixed with one or more of the liquid lubricants such as polydimethyldiphenylsiloxane which will serve as a carrier to move the chosen lubricant through the manifolds 26 and nozzels 25. If a lubricant of high viscosity such as stearic acids or flax detergent is used it is heated by the heating means 27 of the manifolds 26 thereby decreasing the liquid's viscosity and causing it to flow properly. Such high viscosity lubricants may also be mixed with one of the liquid lubricants such as polydimethyldiphenylsiloxane.

Application of this lubricant by the apparatus of this invention reduces friction to protect the cable surface, provides the advantage of a tight, wear resistant seal (not shown) where the cable 10 exits the line 11 to prevent loss of pressure, and allows increase in production speed. Quality and productivity are thus increased.

It is preferred that the bare elongated electrical conductor advance along a predetermined straight path through a first extruder head (not shown) which concentrically extrudes semiconductor strand shield thereon. This shielded conductor 60 should then pass through tandem defect detection apparatus (not shown) which detects defects in the strand shield. The tested conductor 60 advances along a predetermined straight path through the tandem second extruder head 20 of FIG. 2 which concentrically extrudes primary insulation 63 thereon in a first extrusion plane and simultaneously and concentrically extrudes an ironed insulation shield 64 thereon in a second extrusion plane. Referring again to FIG. 2, the insulated and shielded conductor 10 then passes along a substantially catenary path through the pressurized vulcanization means 11 in tandem relationship with the second extruder head 20 of FIG. 2 where curing occurs in the pressurized, hot, dry medium. After cooling of the cured conductor 10 in an environment substantially free of water or other liquid coolant the finished conductor 10 is removed from the vulcanization means 11. Defects previously detected are then marked on the finished electrical conductor 10 for future identification and the conductor 10 is collected on a cable storage means (not shown).

The finished electrical conductor of this invention is an insulated cable product having in solution in the insulation matrix the decomposition products of the vulcanization reaction consisting of a mixture containing about 57% acetophenone, 21% cumyl alcohol, 10.5% methylstyrene, 1.8% cumene and 9.7% unknown compounds, and it is characterized by an increased resistance to electrical treeing.

While this invention has been described in detail with particular reference to a preferred embodiment thereof, it will be understood that variations and modifications can be effective within the spirit and scope of the invention as described hereinbefore and as defined in the appended claims.

What is claimed is:
1. A method of continuously fabricating finished electrical conductor comprising the steps of:
 (a) providing an insulation compound and an insulation shield compound provided that particles of at least one of said compounds has absorbed thereon uniformly dispersed incompatible lubricant;
 (b) immediately extruding said lubricant, said insulation compound and said insulation shield compound onto an advancing elongated electrical conductor; and
 (c) immediately passing said insulated and insulation shielded electrical conductor through a dry curing apparatus for vulcanization thereof provided that said incompatible lubricant migrates to the outer surface of said insulated and insulation shield electrical conductor to reduce the coefficient of friction between the outer surface of said conductor and the inner surface of said dry curing apparatus at points where said surfaces meet said insulated and insulation shielded conductor hanging in a catenary so that said insulated and insulation shielded conductor drags against the vulcanization apparatus.

2. A method of claim 1 wherein continuously fabricating finished electrical conductor further comprises the steps of:
 (a) advancing an elongated electrical conductor along a predetermined straight path through a first extruder head;
 (b) concentrically extruding a first layer of semiconductor strand shield onto said advancing conductor;
 (c) advancing said shielded conductor along a predetermined straight path through a second extruder head in tandem relationship with said first extruder head;
 (d) sequentially extruding onto said advancing conductor:
  (1) a second concentric layer of insulation in a first extrusion plane within said second extruder head; and then
  (2) a third concentric layer of ironed smooth insulation shield in a second extrusion plane within said second extruder head;
  further provided that at least one of said second and third layers has incompatible lubricant uniformly dispersed therein;
 (e) advancing said shielded, insulated and insulation shield conductor along a predetermined substantially catenary path through a pressurized vulcanization means in tandem relationship with said second extruder head whereby said shielded, insulated and insulation shielded conductor contacts the interior surface of said vulcanization means at a point remote from said second extruder head;
 (f) simultaneously curing the strand shield, insulation and insulation shield of said conductor in a hot, dry medium within said vulcanization means;
 (g) reducing the coefficient of friction between the exterior surface of said curing conductor and the interior surface of said vulcanization means;
 (h) cooling said cured conductor within said vulcanization means in an environment substantially free of water or other liquid coolant;
 (i) removing finished electrical conductor from said vulcanization means; and
 (j) collecting the finished electrical conductor on a cable storage means.

3. The method of claim 1 where step (c) includes the additional step of providing a tight, wear resistant seal at the point where the conductor exits the dry curing apparatus to prevent loss of pressure.

4. The method of claim 1 wherein said small quantity of incompatible lubricant is from about 0.001 liter to about 1000 liters per hour.

5. The method of claim 4 wherein said small quantity is from about 1 liter to about 10 liters per hour.

6. The method of claim 1 wherein step (b) further comprises passing said particles and lubricant mixture through an extruder and extruder head having a multiplicity heat zones to achieve proper extrusion temperature and having filtering screen to filter foreign material therefrom and to achieve proper backpressure.

7. The method of claim 6 wherein a first heat zone has a temperature of about 230° F., a second heat zone has a temperature of about 240° F., a third heat zone has a temperature of about 250° F., a fourth heat zone has a temperature of about 260° F., an extruder head heat zone has a temperature of about 260° F. and 20-40-80-0-100 mesh per square inch screen is used when high voltage cable insulation with a melting range of from about 240° F. to about 270° F. is extruded.

8. The method of claim 6 wherein a first heat zone has a temperature of about 230° F., a second heat zone has a temperature of about 240° F., a third heat zone has a temperature of about 250° F. a fourth heat zone has a temperature of about 260° F., an extruder head heat zone has a temperature of about 260° F., and 20-40-60 mesh per square inch screen is used when low voltage cable insulation with a melting range of from about 250° F. to about 290° F. is extruded.

9. The method of claim 1 wherein step (a) further comprises:
 (a) dehumidifying said particles by heating them to about 140° F.;
 (b) spraying small quantities of atomized incompatible lubricant onto said particles; and
 (c) intensively and thoroughly mixing said lubricant with said particles.

10. The method of claim 9 wherein said incompatible lubricant is heated to about 140° F. prior to spraying thereof on said particles to promote proper flow and atomization of said lubricant and to promote adsorption of said lubricant onto said particles.

11. The method of claim 9 wherein intensively and thoroughly mixing said lubricant with said particles further comprises:
 (a) spraying said lubricant angularly upward at high velocity through a plurality of symmetrically spaced spraying means to create spiral or circular turbulence of said particles in a particular direction;
 (b) passing said particles and lubricant through a fixed helical element of a motionless mixer having spiral alignment opposite to said particular direction thus abruptly changing the direction of said particles and lubricant flow to intensify mixing thereof;
 (c) passing said particles and lubricant through a subsequent multiplicity of fixed off-set helical elements of said motionless mixer to subdivide the particle and lubricant flow resulting in exponential increase in stratification and thorough mixing thereby preventing bridging or agglomeration of the mixture of particles absorbed with uniformly dispersed lubricant.

12. The method of claim 11 wherein the number of striations produced as said particle and lubricant flow undergoes an exponential increase in stratification by flowing across said off-set helical elements is $2^n$ where n is the number of helical elements subdividing said particle and lubricant flow.

13. The method of claim 9 wherein said lubricant is selected from the group consisting of: hydrocarbon derivities, parafins, alkylaryl polysiloxane, polydimethyldiphenylsiloxane, water-dilutable siloxane emulsion, siloxane polydimethylsiloxane, water-dilutable silicone emulsion, glycerol, polyalkylene glycol, trihydroxyhexane, polyethylene glycol, polyethylene propylene glycol, aluminum stearate, zinc stearate, stearic acid, animal fat detergents, vegetable detergents and mixtures thereof.

14. The method of claim 13 wherein certain of said lubricants in powdered form such as aluminum stearate or zinc stearate are mixed with one or more additional lubricants in liquid form such as polydimethyldiphenylsiloxane which serve as carriers for said powdered lubricant.

15. The method of claim 13 wherein lubricants normally solid at room temperature are heated to about 140° F.

16. The method of claim 13 wherein lubricants normally solid at room temperature are mixed with one or more liquid lubricants such as polydimethyldiphenylsiloxane.

17. The method of claim 13 wherein lubricants normally solid at room temperature are mixed with one or more liquid lubricants such as polydimethyldiphenylsiloxane and heated to about 140° F.

* * * * *